Nov. 16, 1926.

LE ROY R. PRESCOTT 1,607,363

GREASE NOZZLE

Filed June 8, 1925

Inventor
LeRoy R. Prescott
By Frank E. Liverance, Jr.
Attorney.

Patented Nov. 16, 1926.

1,607,363

UNITED STATES PATENT OFFICE.

LE ROY R. PRESCOTT, OF MUSKEGON, MICHIGAN, ASSIGNOR TO BENNETT PUMPS CORPORATION, OF MUSKEGON, MICHIGAN, A CORPORATION OF MICHIGAN.

GREASE NOZZLE.

Application filed June 8, 1925. Serial No. 35,619.

This invention relates to a nozzle adapted for attachment to the end of a hose conduit through which grease may be forced for the lubrication of mechanisms usually enclosed in a housing or casing. This is particularly the case in automobiles wherein the grease is directed to the transmission gearing casing or the housing wherein the differential gearing, ring gear and pinion in motor vehicles are enclosed.

It is an object and purpose of the present invention to make a nozzle by means of which the grease may be entered into such casings or housings and all of the grease going from the delivery end of the nozzle completely cleaned therefrom when the operation is completed, there being no residue left to later drip or detach from the end of the nozzle. This is very desirable, as is evident. A further object of the invention is to provide the nozzle structure with an automatic shut-off which permits the passage of grease from the hose to the nozzle but automatically and positively stops return thereof from the nozzle to the hose. Various other objects and purposes than those stated will appear as understanding of the invention is had from the following description, taken in connection with the accompanying drawing, in which, Fig. 1 is a central longitudinal section through the nozzle, the parts being in position for the passage of grease from the delivery end of the nozzle.

Like reference characters refer to like parts in the different figures of the drawing.

Figure 1:
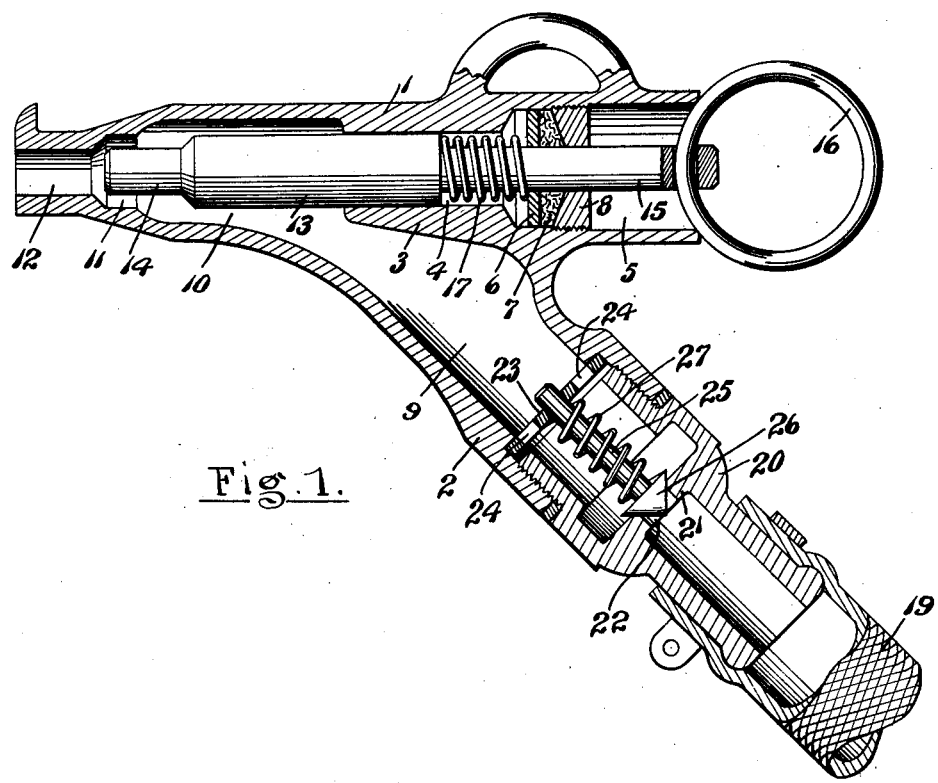

In the construction of the nozzle, a substantially cylindrical body 1 is provided from which at its under side and extending downwardly and outwardly therefrom at an angle is a branch 2. The body 1 at its juncture with the branch 2 and at the interior of the same is formed with an integral boss 3 through which a cylindrical opening 4 is made communicating at its outer end with a larger opening 5 made inwardly from the outer end of the body. A washer 6 is located adjacent the inner end of said opening 5 against which packing material 7 engages at its outer side, said packing being compressed against the washer 6 by a nut 8 threaded into the opening at 5 as shown.

A passage 9 is made through the branch 2 under the boss 3 and communicates with a passage 10 in the body 1 in front of the said boss. The passage 10 is of relatively large cross section and at its front end communicates with a short passage 11 of smaller diameter which in turn communicates with a still smaller outlet passage 12 in the delivery end of the nozzle.

A plunger is mounted lengthwise of the body 1, including a cylindrical intermediate section 13 having a diameter such that it fits but freely passes into the opening 4 in boss 3 previously described. The diameter of the short passage 11 is the same as that of the opening 4 so that in one position of the plunger the front end of said intermediate section 13 is received therein, as shown in Fig. 2. At the front end of the said section 13 a shorter and smaller section 14 is located of a length that when the plunger is in its closed position, shown in Fig. 2, the free end of said section 14 just projects beyond the delivery end of the nozzle. At the opposite end of the plunger, it is reduced in diameter and extended as a rod 15 which passes through the washer 6, packing 7, and nut 8 and has a ring 16 larger in diameter than the diameter of the opening 5 connected thereto. A coiled spring 17 is located around the rod 15 between said washer 6 and the outer end of the section 13 of the plunger, the normal tendency of which is to force the plunger to the position shown in Fig. 2. The outer end of the body is slotted in opposite sides through to the opening 5, as indicated at 18, said slots being wide enough that the ring 16 may pass freely therein. Accordingly, when the ring is located in said slots, the plunger is projected to the position shown in Fig. 2, and when it is drawn out of the slots and turned about the axis of the plunger to a different position, bearing against the end of the body 1, the plunger is held in the position shown in Fig. 1 and will remain in such position until the ring is turned to enter said slots 18.

The hose 19 which carries the grease to the nozzle at its end is equipped with a fitting 20 which is threaded into the end of the branch 2. There is a passage through said fitting 20 across which is a transverse partition 21 with an opening 22 therethrough. A disk 23 having grease passing openings 24 therein is located across the branch 2 at the inner end of the fitting 20 and a valve stem 25 having a conical valve 26 at its outer end extends through the disk 23, the valve 26 engaging the partition 21 at the opening 22 and normally closing said opening under pressure of spring 27 located around the stem 25 between the disk 23 and the valve 26.

Figure 2:
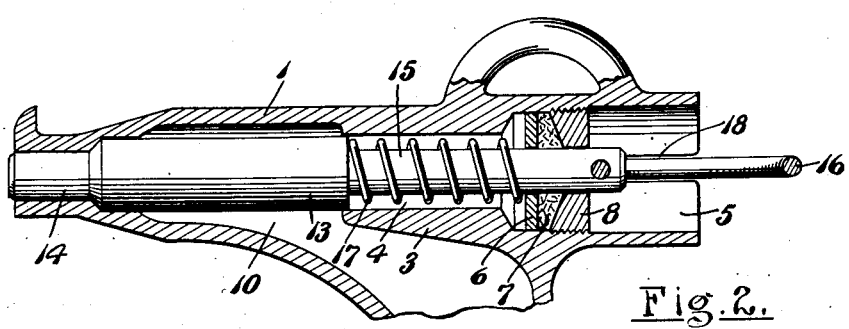
Fig. 2 is a fragmentary section, similar to that shown in Fig. 1, the nozzle being closed against the passage of the grease.
Figure 3:
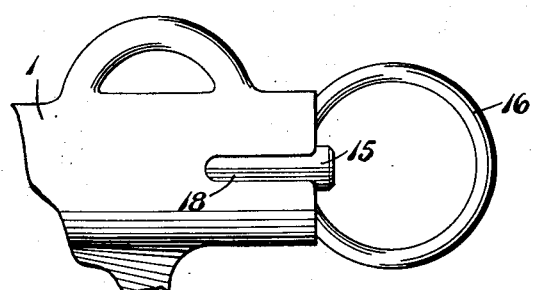
Fig. 3 is a fragmentary elevation of the outer end of the nozzle.

The grease is forced through the hose 19 from any main supply receptacle containing the grease by any suitable type of pumping or pressure means, the force being sufficient to cause the valve 26 to unseat and allow the grease to pass through the passage 9 in the branch 2 to the passage 10; and if the plunger is withdrawn and held in the position shown in Fig. 1, the grease will follow the passages 11 and 12 and be delivered to any housing or casing into which the delivery end of the nozzle may be inserted. Any attempted back movement of the grease is at once stopped by the shut-off valve at 26. When the desired amount of grease has been supplied, the ring 16 is moved to enter the slots 18 with a movement of the plunger to closed position, as in Fig. 2, the end section 14 of the plunger passing entirely through the reduced outlet passage 12 and carrying all of the grease in said outlet passage ahead of it so that no particles of grease adhere to the nozzle end, which might afterward drop therefrom. This is a feature of the invention which is of considerable value particularly in the matter of cleanliness in handling the grease. The shut-off valve construction is also a valuable feature of the invention insuring as it does that there shall always be a steady flow of grease when the delivery of grease is taking place. This construction of grease nozzle has proved particularly practical and serviceable. The invention is defined in the appended claims and is to be considered as comprehensive of all forms of structure coming within their scope.

I claim:

1. In a construction of the class described, a body having a branch extending therefrom between its ends, said body at one end having a relatively large opening extending lengthwise of the body and communicating with the inner end of which is a smaller cylindrical opening, said body in front of said smaller opening having a passage therethrough extending to the opposite end thereof, said passage being of smallest diameter for a short distance directly at said opposite end, then enlarged in diameter for a short distance and then further enlarged, and said branch having a longitudinal passage communicating with said last mentioned and further enlarged portion of the passage in said body, a plunger located within and lengthwise of the body having a cylindrical intermediate section substantially fitting but freely movable in said smaller opening and in said first enlarged portion of the passage in said body, an end section fitting but freely slidable through the smallest outer portion of the passage, and a rod of reduced diameter extending from the opposite end of said intermediate section, spring means acting on the plunger to move the same normally so that said end section of the plunger passes through the said smallest outer portion of said passage, and manually operable means for moving the plunger in the opposite direction and thereby open the passage through the body.

2. A construction containing the elements in combination defined in claim 1, combined with means for holding said manually operable means and the plunger attached thereto against movement to normal position.

3. A construction containing the elements in combination defined in claim 1, combined with a washer located near the inner end of said enlarged opening in the end of the body, a packing located against the washer and a nut threaded into said opening against the packing, the rod on the plunger passing through said washer, packing and nut, said end of the body being provided with slots at its end cut through to said enlarged opening, and a ring having a larger diameter than the diameter of the body at such end connected to said rod at its outer end, the slots in the body being wide enough to receive said ring, substantially as described.

In testimony whereof I affix my signature.

LE ROY R. PRESCOTT.